April 30, 1968      R. M. STRAHAN      3,380,702

FREEZING TRAY

Filed Feb. 16, 1966

INVENTOR.
Robert M. Strahan
BY
His Attorney

United States Patent Office 3,380,702
Patented Apr. 30, 1968

3,380,702
FREEZING TRAY
Robert M. Strahan, Vandalia, Ohio, assignor to General Motors Corporation, Detroit, Mich., a corporation of Delaware
Filed Feb. 16, 1966, Ser. No. 527,826
4 Claims. (Cl. 249—71)

This invention pertains to freezing trays and more particularly to an arrangement for preserving the ease of removal of cubes from such trays.

Many devices have been made in the attempt to provide easy harvesting of ice cubes from trays. The coating of the pans and grids which began about 30 years ago, was a big step forward. The coating materials which originally were simple waxes, have been considerably improved in quality and variety. Although the newer coatings remain effective for longer usage than the original waxes, they still gradually loose their effectiveness long before they or the refrigerator on which they are used is obsolete. I have found that one reason the coatings loose their effectiveness is the scraping and wearing action of the transverse movable walls of the grids upon the adjacent walls of the tray or pan. It has been customary to allow the transverse movable walls to rest by gravity upon the bottom of the tray or pan to minimize the area of ice bridge between the cubes for making it easier to break the bond between the cubes and for increasing the conduction between the tray and the grid to reduce the freezing time when the trays are supported on a refrigerated surface. Consequently, the movement of the transverse walls or grid scrape the contact surfaces of the tray or pan.

It is an object of this invention to prolong the effectivenes of the coating of the freezing trays by maintaining sufficient clearance between the movable transverse walls of the grid and the pan to prevent rubbing and scraping of the wax coating.

It is another object of this invention to prolong the effectiveness of the coating of the tray or pan by suspending the movable transverse walls with their bottoms above the bottom of the longitudinal wall or walls so that the transverse walls will not rest by gravity upon the bottom of the pan and will not rub or scrape the coating.

These and other objects are attained in the form shown in the drawings in which the longitudinal wall or walls of the the grid are supported upon the bottom of the tray while the transverse movable walls are supported upon the longitudinal wall or walls with their bottoms having sufficient clearance relative to the bottom of the tray to prevent the rubbing or scraping of the coating thereon. This prolongs the useful life of the coating and aids in preventing any reduction in the ease of release of the frozen cubes from the tray.

Further objects and advantages of the present invention will be apparent from the following description, reference being had to the accompanying drawings wherein preferred embodiments of the present invention are clearly shown.

Figure 1:
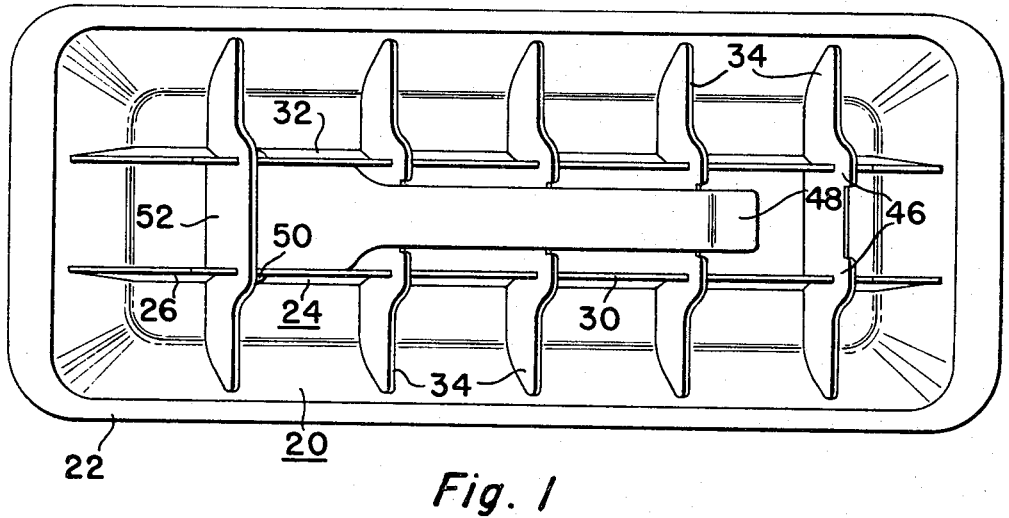
FIGURE 1 is a top view of a freezing tray embodying one form of my invention.
Figure 2:
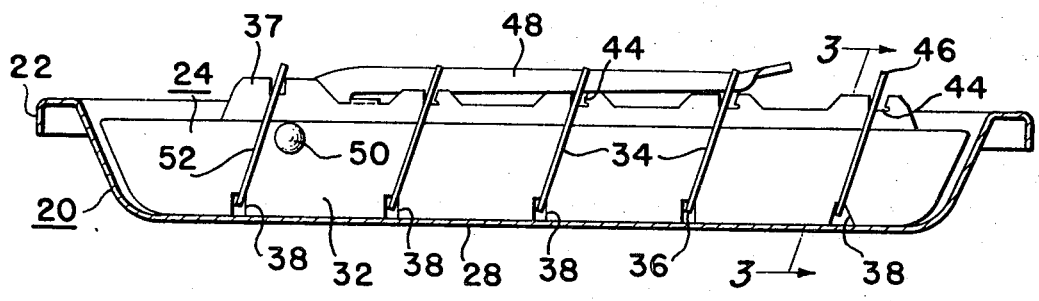
FIGURE 2 is a sectional view of the tray taken along the lines 2—2 of FIGURE 3; and, FIGURE 3 is a transverse vertical sectional view taken along the lines 3—3 of FIGURE 2.
Figure 3:
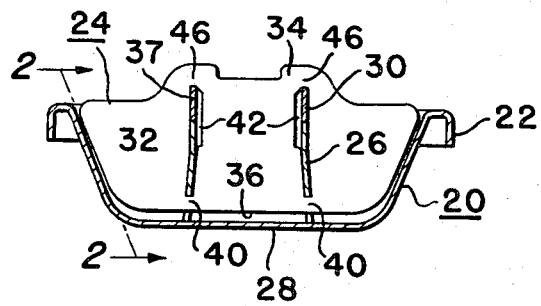

Referring now to the drawings, there is shown the freezing tray in the form of a long rectanuglar retainer pan 20 having sloping sides surrounded by a turned-down rim 22. Prior to any assembly, the pan 20 has its interior coated with polytetrafluoroethylene. In addition to this, the aluminum pan 20 is anodized and coated with the coating material disclosed in Patent 3,016,719, issued Jan. 16, 1962. Within the pan is a removable grid 24. This removable grid includes a longitudinal wall having a lower portion 26 resting upon the bottom 28 of the pan 20. The longitudinal wall also includes an upper portion 30 having its lower edge sliding upon the upper edge of the lower portion 26. Preferably, there is also a second longitudinal wall 32. The lower portion of these longitudinal walls 26 and 32 are inclined inwardly as illustrated in FIGURES 1 and 3, so as to facilitate the release of the frozen cubes from the grid.

According to my invention, the transverse walls 34 of the grid 24 are supported with their bottom edges 36 held above the bottom 28 of the tray 22 at all times by the upper longitudinal bars 30 and 37. The upper longitudinal bars 30 and 37 are slidably mounted on top of the lower portions 26 and 32 for longitudinal movement relative to each other. The bars 30 and 37 may be vertical or inclined similarly to the lower portions 26 and 32. The lower portions 26 and 32 are provided with a plurality of spaced notches 38 in its bottom edge which receives the webs 40 beneath the slots 42 in the transverse movable wall 24 through which extend the longitudinal walls 26 and 32. These notches 38 face downwardly while the upper bars 30 and 37 are provided with an equal number of similarly spaced upwardly extending notches 44. The bottoms of the notches 44 support the web portions 46 of the transverse movable walls. All parts of the grid 24 are anodized and coated with the coating material disclosed in Patent 3,016,719, issued Jan. 16, 1962.

A lever 48 is pivoted by a rivet 50 to the lower portion of the longitudinal walls 26 and 32. The front portion of the lever 48 when lifted, pivots on the rivet 50 and engages the upper portion of the first transverse wall 52 and through the interfitting of the first transverse wall 52 with the first notch in the upper portion 30 and 37 of the longitudinal walls 26 and 32. to move forward the notches 44 in the upper portions 30 and 37 to progressively move the upper portions of the transverse movable partition walls 34 and 52 to loosen the cubes from the tray preparatory to dumping or otherwise removing the frozen cubes. The bottoms of the notches 44 are sufficiently high to engage the webs 46 to hold the bottoms 36 of transverse walls 34 and 52 away from the bottom 28 of the pan throughout the movement of these transverse walls. Through this arrangement, sufficient clearance is maintained between the bottoms 36 of the transverse walls 34 and 52 and the bottom 28 of the pan 22 to prevent the bottoms of the transverse walls from scraping the bottom of the pan 20 during the loosening of the frozen liquid within the tray.

The grid is arranged to be freely removable excepting when liquid is frozen therein. This makes it convenient to wash the tray with cold water. When the transverse walls 34 and 52 are moved forward they break the cubes of frozen liquid away from the bottom 28 of the tray and also in a shearing action break themselves loose from the ice. In this action the bottom edge of the transverse walls 34 and 52 are always maintained above the bottom 28 of the tray 20. The ice beneath the bottom edges of the transverse walls 34 and 52 also tends to prevent the scraping of the bottom 28 of the tray. The notches 44 in the upper portions 30 and 37 are made of progressively increasing width from the front portion adjacent the rivet 50 to the rear so that the mechanical load involved in progressively breaking loose the ice cubes from the tray and grid is distributed throughout the greater portion of the movement of the handle 48 for better efficiency. Therefore, by minimizing the scraping action through providing clearance between the bottoms 36 and the bottom 28, the life of the coating is prolonged to maintain easy removal of the cubes from the tray.

While the embodiments of the present invention as herein disclosed, constitute preferred forms, it is to be understood that other forms might be adopted.

What is claimed is as follows:

1. A freezing tray including a container pan having a bottom, a grid for dividing the interior of the pan comprising a longitudinal wall resting substantially upon the bottom of the pan and transverse movable walls resting upon and supported by said longitudinal wall above the bottom of the tray, said longitudinal wall comprising upper and lower portions longitudinally movable relative to each other, said upper portion having means for supporting said transverse walls with their bottoms above the bottom of the lower portion of the longitudinal wall, the bottom of said longitudinal wall extending to a lower level than the bottoms of said transverse movable walls.

2. A tray as defined in claim 1 having two longitudinal walls each resing substantially upon the bottom of the tray and each having means for supporting the transverse walls sufficiently above the bottom of the tray throughout any movement thereof to prevent any contact with said bottom.

3. A tray as defined in claim 1 having means for moving said transverse walls relative to said longitudinal wall and keeping the bottoms of the transverse walls above the bottom of said longitudinal wall throughout the movement.

4. A tray as defined in claim 1 having two longitudinal walls each resting substantially upon the bottom of the tray and each having means for supporting the transverse walls sufficiently above the bottom of the tray throughout any movement thereof to prevent any contact with said bottom, each of said longitudinal walls comprising upper and lower portions longitudinally movable relative to each other, each of said upper portions having means for supporting said transverse walls with their bottoms above the bottoms of the lower portions of the longitudinal walls.

References Cited
UNITED STATES PATENTS

| | | | |
|---|---|---|---|
| 2,009,803 | 7/1935 | Hallock | 249—71 |
| 2,351,303 | 6/1944 | Storer | 249—72 |
| 2,599,972 | 6/1952 | Buchanan | 249—71 X |
| 2,886,958 | 5/1959 | Frei | 249—130 |
| 2,949,020 | 8/1960 | Erickson et al. | 249—71 |

J. HOWARD FLINT, JR., *Primary Examiner.*